United States Patent
Kanzler et al.

(10) Patent No.: US 7,025,158 B2
(45) Date of Patent: Apr. 11, 2006

(54) PISTE-MAINTENANCE TRACKLAYING VEHICLE

(75) Inventors: Helmut Kanzler, Voehringen (DE); Michael Kuhn, Illerkirchberg (DE)

(73) Assignee: Kaessbohrer Gelaendefahrzeug AG, Laupheim (DE)

( * ) Notice: Subject to any disclaimer, the term of this patent is extended or adjusted under 35 U.S.C. 154(b) by 0 days.

(21) Appl. No.: 09/982,215

(22) Filed: Oct. 18, 2001

(65) Prior Publication Data
US 2002/0079145 A1    Jun. 27, 2002

Related U.S. Application Data

(63) Continuation of application No. 09/171,690, filed as application No. PCT/EP97/02151 on Oct. 23, 1998, now abandoned.

(30) Foreign Application Priority Data
Apr. 26, 1996  (DE) .......................... 296 07 651 U

(51) Int. Cl.
*B60K 6/04* (2006.01)
(52) U.S. Cl. ................................... 180/65.3
(58) Field of Classification Search ............... 180/6.2, 180/6.5, 9.1, 9.21, 53.1, 53.8, 65.2, 65.3, 180/65.4, 65.6, 165; 477/125
See application file for complete search history.

(56) References Cited

U.S. PATENT DOCUMENTS

| | | | |
|---|---|---|---|
| 1,863,504 A | | 6/1932 | Schmid, Jr. |
| 2,735,253 A | * | 2/1956 | Huddle ...................... 180/53.1 |
| 4,113,045 A | | 9/1978 | Downing, Jr. |
| 4,335,429 A | * | 6/1982 | Kawakatsu ................ 180/65.2 |
| 4,545,450 A | * | 10/1985 | Mambelli .................. 180/53.1 |
| 4,632,200 A | * | 12/1986 | Doyen et al. .............. 180/53.1 |
| 4,669,562 A | * | 6/1987 | Taga et al. ................. 180/53.1 |
| 4,738,326 A | * | 4/1988 | Inoue ........................ 180/53.1 |
| 5,018,592 A | * | 5/1991 | Buchdrucker ............... 180/6.2 |
| 5,022,478 A | * | 6/1991 | Hartmann ................. 180/53.1 |
| 5,101,919 A | * | 4/1992 | Ossi ........................... 180/6.2 |
| 5,363,937 A | * | 11/1994 | James ........................ 180/6.5 |
| 5,373,909 A | * | 12/1994 | Dow et al. .................. 180/9.1 |
| 5,531,282 A | * | 7/1996 | Jennen ........................ 180/9.1 |
| 5,590,041 A | * | 12/1996 | Cooper ....................... 180/6.2 |
| 5,649,880 A | * | 7/1997 | Tsutsui et al. .............. 477/125 |
| 5,857,532 A | * | 1/1999 | Satzler ........................ 180/6.2 |

FOREIGN PATENT DOCUMENTS

| | | |
|---|---|---|
| DE | 2244385 | 3/1974 |
| EP | 0089460 | 9/1983 |
| WO | WO 9208278 | 5/1992 |
| WO | 94/09548 | * 4/1994 |
| WO | WO 9409548 | 4/1994 |

\* cited by examiner

*Primary Examiner*—Frank Vanaman
(74) *Attorney, Agent, or Firm*—Crowell & Moring LLP

(57) ABSTRACT

A piste-maintenance tracklaying vehicle including a vehicle control unit and an internal combustion engine. The internal combustion engine is drivingly connected via a gear to a drive sprocket of at least one track. Accessory drives for additional devices are mountable on the tracklaying vehicle, and may include vehicle components such as a tilting device for a platform and driver's cab or track tensioner. An internal combustion engine is connected via a generator and at least one electric motor and a gear to each drive sprocket. In overrun mode an electric motor is switchable as a current generator for accessory drives designed as electrohydraulic or electric drives. The electric drive for a shaft of said additional device is electrically synchronized with the electric motor of said drive sprocket through the vehicle control unit.

7 Claims, 4 Drawing Sheets

PISTE-MAINTENANCE TRACKLAYING VEHICLE

This application is a continuation of U.S. application Ser. No. 09/171,690, filed Oct. 23, 1998, now abandoned, which is a national stage application of PCT Application PCT/EP97/02151, filed Apr. 25, 1997, which claims the benefit of German Application 296 07 651.1, filed Apr. 26, 1996.

BACKGROUND OF THE INVENTION

The present invention relates to a piste-maintenance tracklaying vehicle.

Such a vehicle is known from WO94/09548. In the prior-art vehicle, an electric motor for a drive wheel of a track is driven by an internal combustion engine via a generator. In the overrun mode, the electric motor can be switched as a current generator for accessory drives of the vehicle. Such accessory drives are intended for additional devices that are mountable on the piste-maintenance vehicle, such as a rotary snow plow, a front snow plow blower, or the like, and/or for vehicle components, such as a tilting device for platform and driver's cab or for track tensioning.

The prior-art tracklaying vehicle has the disadvantage that for instance electric motors for a snow plow shaft are directly controlled by a high-performance control unit, without any information being furnished on a dependence of such a control unit on the vehicle speed, or the like.

SUMMARY OF THE INVENTION

It is therefore the object of the present invention to improve a tracklaying vehicle of the above-mentioned type in such a manner that a uniform piste maintenance of an unvarying high quality is ensured independently of the vehicle speed or an uphill or downhill driving of the vehicle.

In a tracklaying vehicle this object is achieved in that the electric drive for a shaft of the snow plow is synchronized with the electric motor for the drive sprocket. It is thus possible to adapt snow plow shaft speed and travel speed to one another, resulting in a defined number of tooth engagements of the snow plow shaft per distance covered.

Furthermore, in comparison with hydrostatic drives that are known in practice, one generally obtains an equally good protection against and resistance to environmental factors and overloading. The electric motor permits a precise control of the power transmission. Due to the increased efficiency of the electric drive system the latter yields an identical or even increased tractive force on the drive sprocket and a vehicle performance comparable to or even better than that of a hydrostatic drive.

Since all of the hydraulic components of a hydrostatic drive in the drive train are no longer needed, the weight of the piste-maintenance vehicle is considerably reduced, and all difficulties that might arise from sealing and from the hydraulic medium supply of a hydrostatic drive are no longer observed.

Generator and electric motor and the corresponding connections between said members and to the internal combustion engine can be installed easily and without any major changes on the main frame of the tracklaying vehicle. Furthermore, an electric motor is exactly controllable in its performance and can be used as a brake during downhill driving or in the overrun mode, with energy being possibly fed back at the same time due to the generator effect of the electric motor.

In addition to a good efficiency of the drive system, such an energy feedback effects a further reduction of the energy consumption, as the energy gained can for instance be used directly for operating the accessory drives for the additional devices.

The accessory drives for the additional devices which are mountable on the vehicle and/or for further vehicle components can be designed as electrohydraulic or electric drives. Electric drives may for instance be preferred for rotatory movements, for instance for a shaft of the rotary snow plow, for a front snow plow blower with screw and blower wheel, for a winch drive, or the like. Electrohydraulic drives can be used for the adjusting mechanisms at the front and rear on the tracklaying vehicle, for a parking brake, for tilting devices, for the track tensioner, or the like. The adjusting mechanisms serve, for instance, to adjust the corresponding device carrier at the front and rear and for adjusting additional devices, such as front snow plow blower or snow clearing blade. A tilting device on the tracklaying vehicle serves to tilt the driver's cab or to tilt a loading platform of the tracklaying vehicle.

For instance, for exactly controlling each drive sprocket as such and thus for steering, for instance, the tracklaying vehicle through different rotational speeds of the drive sprockets, it turns out to be advantageous when each drive sprocket is connected to a separate electric motor.

For a corresponding motional connection of electric motor and drive sprocket, a planetary gear may be arranged between said members in a manner which is known per se or a steering gear may be arranged when only one electric motor is used for both drive sprockets.

When an electric motor is used for each drive sprocket, the electric motors can be coupled with one another when one of the electric motors fails. As a result, the tracklaying vehicle can also be moved onwards with only one electric motor.

When only one electric motor and one steering gear are used, these members can for instance be arranged centrally on the tracklaying vehicle, whilst planetary gears and drive sprocket form one respective unit and are spatially assigned to each track. Likewise, the planetary gears for the two drive sprockets of each track and the steering gear can form a unit which is for instance arranged on the vehicle in central fashion and is connected to the drive sprockets via a mechanical coupling of its own.

Instead of the electrohydraulic drives for the corresponding linear movements and small consumers, corresponding electric drives can also be used.

When electrohydraulic drives are used, it is of advantage for reasons of environmental protection when the corresponding hydraulic medium for the drive is a medium based on water.

To store the recovered energy which is not directly needed, during downhill driving or in the overrun mode of the tracklaying vehicle, the tracklaying vehicle may be designed in a further variant with an energy buffer as an additional device which can be fed by the generator or an electric motor operating as a generator. Such an energy buffer may be a conventional battery, a flywheel storage means, or the like.

To control the vehicle drive with internal combustion engine, generator and electric motor and to produce and distribute energy, the tracklaying vehicle comprises an electronic high-performance means at least for controlling travel motors and/or the accessory drives. For instance, speed, frequency and current intensity of the electric travel motors, of the snow plow drive, the drives of an electric winch or an electric front snow plow blower, or the like, can be controlled by the electronic high-performance means. Furthermore, the vehicle control unit in cooperation with the electronic high-performance means can control the energy production of internal combustion engine/generator and of electric motors or the energy consumption by the electric motors. Furthermore, the electronic means controls the switching of the electric motor to the current generator and thus to the energy supplier during downhill driving or in the overrun mode.

To use the internal combustion engine in a manner which is optimum for consumption and with less emissions, it is also advantageous when the internal combustion engine has an electronic engine control. The electronic engine control unit can communicate with the drive control unit or the electronic high-performance means and can be controlled by said means for controlling the engine speed in response to the amount of energy actually required.

When at least the electrohydraulic drives are arranged in a decentralized manner and comprise an electric motor, a pump, a control block and a hydraulic medium tank, the corresponding hydraulic lines can be relatively short and said decentralized electrohydraulic drives may be fed via electric lines. As a result, said electrohydraulic drives can be arranged as compact units in the vicinity of the consumers proper. A gear pump may for instance be used as a corresponding pump for the hydraulic medium.

It is here also of relevance that such an electrohydraulic drive can, for instance, feed a plurality of consumers, such as a drivers cab tilting means and track tensioner, or the like.

To ensure easy access to the electronic high-performance means and to permit connections to all consumers that are as short as possible, the electronic high-performance means is centrally arranged in the tracklaying vehicle for distributing energy to all consumers and for energy feedback.

When all components of the tracklaying vehicle, in particular the electronic means and also the drive train, are composed as modules, the corresponding modules can be inserted or supplemented in all types of the tracklaying vehicles. The modules have corresponding standardized interfaces.

For additionally braking the tracklaying vehicle during standstill and for increasing safety, the tracklaying vehicle can comprise a parking brake, in particular a multidisc brake which is integrated in the planetary gearing.

When the tracklaying vehicle has a winch structure, with the winch including an electric drive, the drive may also be designed for energy feedback during downhill driving. The recovered energy can, for instance, be used for driving the snow plow shaft or other accessory drives.

To feed the tracklaying vehicles externally with energy, in particular electric energy, the vehicle may comprise an energy feeding means. Preferably, said means is designed as a trailing cable or as a coupling system which can be coupled with contact wires or current rails.

In particular in frequently traveled sections of the pistes, the tracklaying vehicle can thus be moved without any emissions, while energy is fed through the contact wires or current rails. At the same time, the energy buffers of the vehicle can be loaded.

Corresponding current rails can, for instance, be mounted along lift sections or at the piste edge at a sufficiently safe height. These current rails may be carriers for floodlight installations at the same time. Furthermore, the tracklaying vehicle may alternatively be connected with its energy feeding means to current sources which are arranged at specific locations, for instance along the piste.

It should here be noted that in tracklaying vehicles which are preferably used with indoor skiing, energy is exclusively supplied via the energy feeding means. In such a case the internal combustion engine with corresponding generator and the necessary accessory units, such as engine cooling system, starters, dynamo, fuel tank, starter battery, etc. can be dispensed with. During a purely electric operation of the tracklaying vehicle, the weight is further reduced considerably.

Coupling to the contact wires or the current rails can be carried out via a winch structure, with the external electric energy being supplied via a line to the reel.

For instance, in order to use and feed several tracklaying vehicles jointly when pistes are being maintained, such a tracklaying vehicle equipped with an external electric energy supply can comprise an interconnection means for energetic connection to at least one further tracklaying vehicle. Electric energy can thereby be transmitted between the connected tracklaying vehicles. Of course, a plurality of tracklaying vehicles can be interconnected in this manner.

The novel drive train of the tracklaying vehicle offers many possibilities of heating the tracklaying vehicle. The vehicle can, for instance, be supplied with exhaust heat from the engines and motors (diesel and/or electric) and/or the hydraulic system and/or the electronic high-performance means. Furthermore, an electric heating means may for instance be used in addition.

For a simplified operation or control of the tracklaying vehicle, the latter may comprise a setpoint transmitter at least for the desired traveling speed. The transmitter may be designed as a standard accelerator. The traveling speed is selected through the corresponding position of the setpoint transmitter and the electric motor speed is adjusted accordingly.

In an advantageous embodiment the electronic high-performance means and the vehicle control unit, respectively, are connected to the setpoint transmitter and comprise an electronic evaluation means.

Depending on the travel resistance, the corresponding setpoint is converted into a corresponding high-performance requirement and into a speed predetermined for the internal combustion engine by the electronic means in consideration of the instantaneous power requirements of other consumers, such as the accessory drives or the like.

For instance, in order to achieve an increased tooth engagement frequency per distance in case of rough pistes, the gear ratio of snow plow shaft to drive sprocket can be adjusted.

To simplify and accelerate maintenance and inspection of the tracklaying vehicle, a diagnosis means may be arranged on the tracklaying vehicle. The diagnosis means is preferably designed as a diagnosis box through which the electric control, in particular, including the electronic high-performance means of the tracklaying vehicle, can be checked in a manner which is known per se.

In a simple embodiment a setpoint transmitter may be designed as an accelerator for predetermining the vehicle speed. The driver chooses the desired travel speed through the accelerator position. In a development of the invention, the speed corresponds to a setpoint for the electric motor speed. The setpoint is also predetermined for a reduction of the speed, so that the vehicle can be braked by a slight operation of the accelerator.

Depending on the actual travel resistance during uphill or downhill driving, a corresponding performance requirement, i.e. a corresponding drive or brake performance, is produced by the setpoint of the electric motor speed. It is here of advantage when such an actual performance requirement is converted by the electronic means into a speed predetermined for the diesel engine, and it is also of advantage when the speed which is consumption-optimum for the power output required is predetermined by means of a characteristic control through the electronic means. Operative states in a partial load range which is disadvantageous for consumption are thereby avoided.

For instance during uphill driving, the electronic means effects a running up of the diesel engine until the speed which is predetermined by the accelerator, or the electric motor speed is again reached. During a braking operation, the braking current control and the electric travel motors, respectively, are controlled via the electronic travel means. The electric travel motors operate as generators in such a case and feed energy back into the system. The remaining energy for other consumers, for instance a rotary snow plow, is provided by the internal combustion engine which is controlled as above. When there is excessive energy of the total system for a short period of time, for instance in case of a rapid emergency stop, the excessive energy is discharged in the conventional manner via brake resistors.

To facilitate starting and stopping operations on a hill, the vehicle has an additional safety logic. This logic may be part of the electronic means of the vehicle control unit or the electronic high-performance means. The electronic safety means checks at least the position of a traveling direction switch, the actuation of the accelerator and the parking brake.

A start during uphill or downhill driving is, for instance, effected in that in successive order the traveling direction switch is operated, the parking brake is released, the vehicle is prevented from rolling by means of power-supplied electric motors, the accelerator is operated and the piste-maintenance vehicle is moved in the end. In a development of the invention, the parking brake is operated automatically, a release of the parking brake being effected during start upon operation of the accelerator.

A stopping operation during uphill or downhill driving is effected by means of a safety logic in that in successive order the accelerator position is moved to the zero position, whereby the piste-maintenance vehicle is slowed down in a controlled manner and stopped, the vehicle is prevented from rolling by a further power supply to the electric motors, the parking brake is automatically operated after a defined stopping time, and the power supply to the electric motors is terminated and the internal combustion engine is further operated in the idling speed mode. The traveling direction switch can then be moved to the neutral position.

The above-described control by means of a setpoint or by means of the safety logic can be performed through a separate electronic control means or an electronic means contained in the vehicle control unit or the electronic high-performance means.

Advantageous embodiments of the present invention will now be explained and described in more detail with reference to the figures attached to the drawing, in which:

BRIEF DESCRIPTION OF THE DRAWINGS

FIG. 5 is a side view of a further embodiment of a tracklaying vehicle.

DETAILED DESCRIPTION OF THE DRAWINGS

Figure 1:
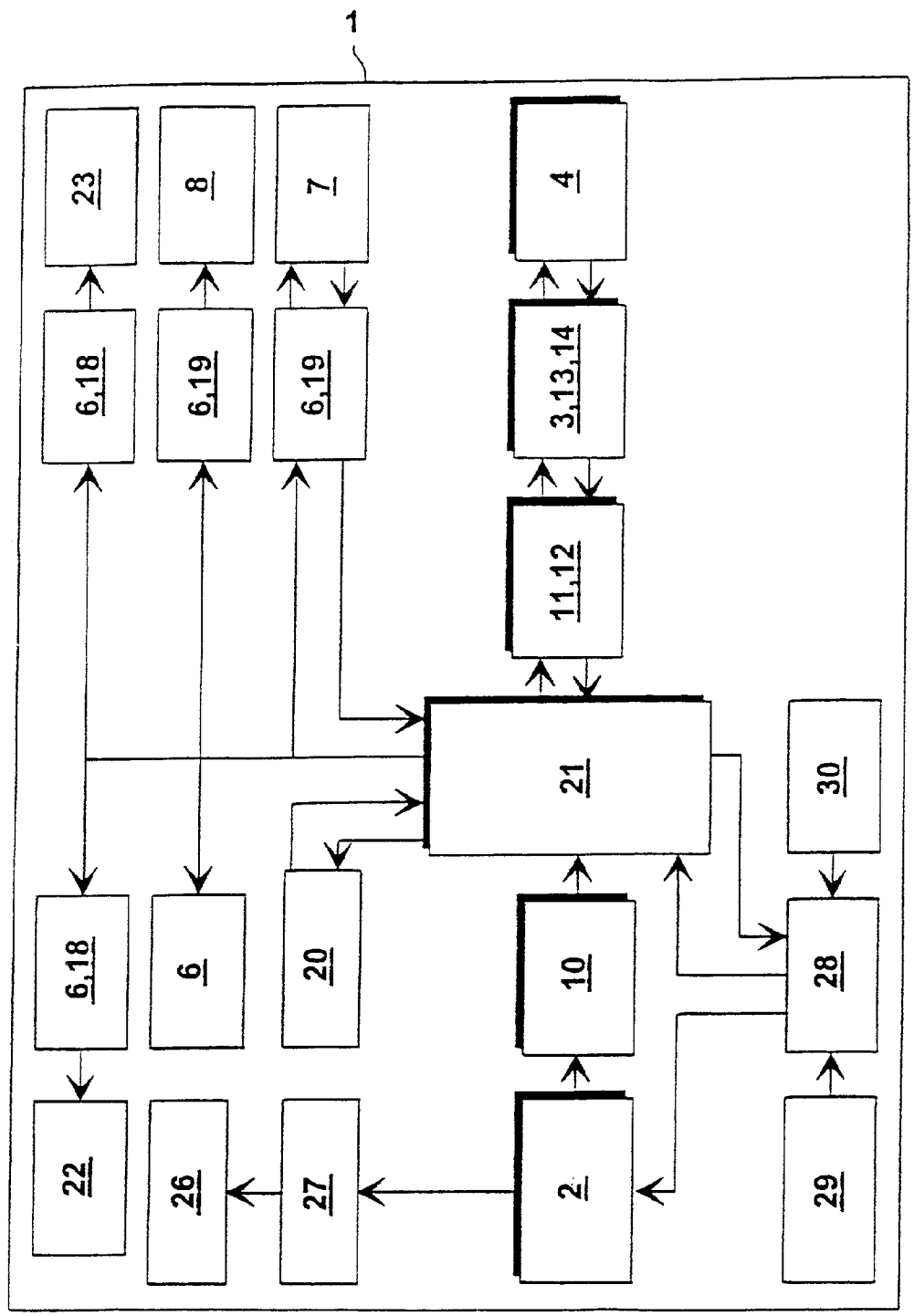
FIG. 1 is a block diagram regarding drive and supply of a tracklaying vehicle.

FIG. 1 is a block diagram for drive and supply with additional devices and further vehicle components.

An internal combustion engine 2 is drivingly connected to a generator 10 for producing electric energy. Furthermore, the internal combustion engine 2 drives a dynamo 27 by which a corresponding vehicle battery 26 can be charged.

An electronic high-performance means 21 which can be fed with current from the generator 10 is centrally arranged in the tracklaying vehicle 1, of which FIG. 1 only shows the principle. The electronic high-performance means 21 controls downstream electric motors 11, 12 for driving the tracklaying vehicle 1. These motors are drivingly connected via corresponding gears 3,13,14 to the drive sprockets 4 of the tracks of the tracklaying vehicle 1.

Energy and information flows between the individual components are represented in FIG. 1 by the directions of arrows. For instance, energy flows from the electronic high-performance means 21 via the electric motors 11, 12 and gears 3,13,14 to the drive sprockets 4. During downhill driving or in the overrun mode the drive sprockets 4 inversely drive the electric motors 11, 12 via the gears 3,13,14 so that these motors can be used as generators and feed energy back via the electronic high-performance means 21.

Furthermore, there is provided a vehicle control unit 28 which on the basis of corresponding predetermined setpoints of accelerator 29 and steering wheel 30 controls as a setpoint transmitter both the internal combustion engine 2 and the electronic high-performance means 21 and transmits the setpoints as control variables.

Depending on the power consumption, the electronic high-performance means 21 can influence the engine speed of the internal combustion engine 2 via the vehicle control unit 28.

Furthermore, the electronic high-performance means 21 is connected to various accessory drives 6. Two of the accessory drives 6 are formed as electrohydraulic drives 18 with electric motor, hydraulic pump and corresponding hydraulic medium supply vessel. These accessory drives are assigned to a front control block 22 and a rear control block 23, respectively.

Two further accessory drives are designed as electric motors 19, optionally with associated gear. One of said accessory drives serves to drive an additional device 7, such as an electric winch by which energy can also be fed back to the electronic high-performance means 21 in accordance with the direction of arrow during downhill driving or in the overrun mode.

The other accessory drive 6 with the electric drive 19 is assigned to a further additional device 8, such as a rotary snow plow.

Finally, in a further embodiment the electronic high-performance means 21 is additionally connected to an energy buffer 20, such as a battery or a flywheel storage means, for storing and supplying energy.

Figure 2:
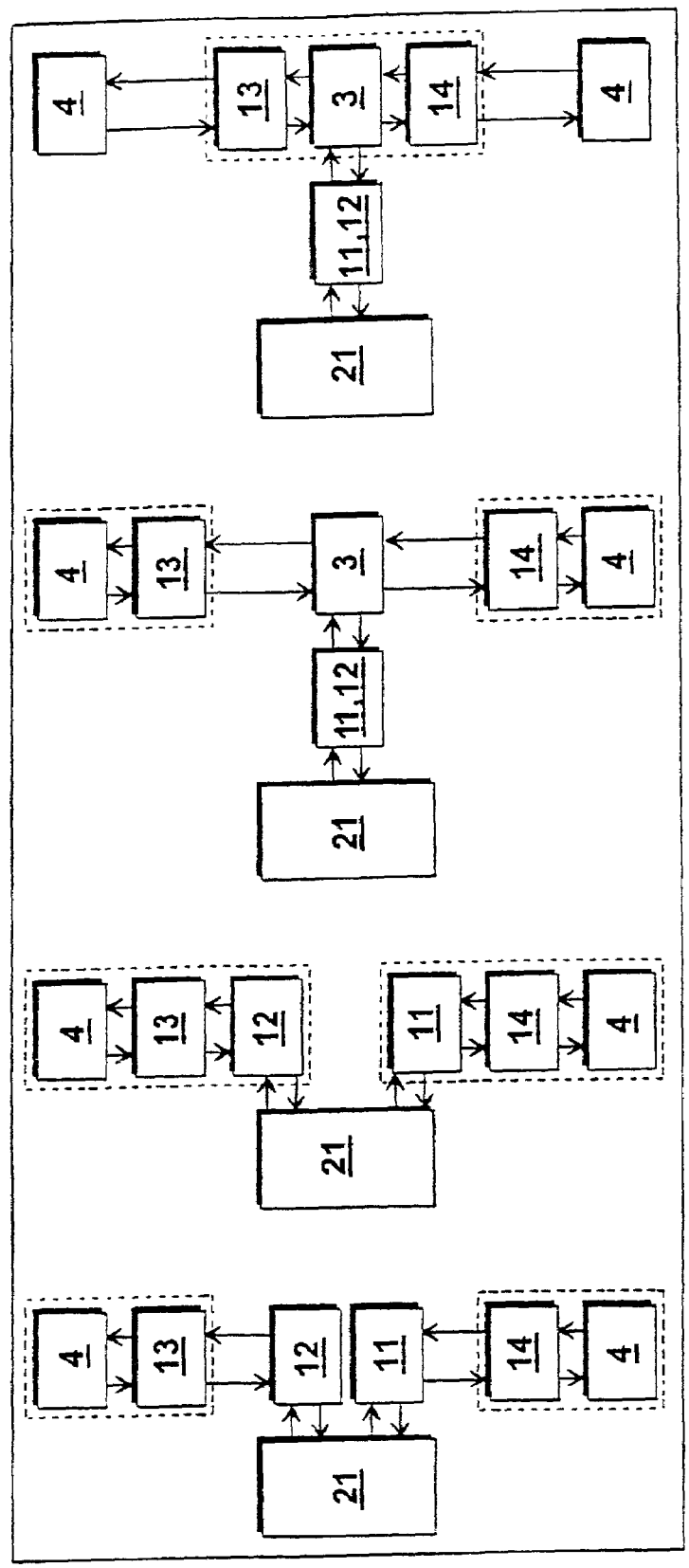
FIG. 2 shows various variants of arranging electric motors and gears.

FIG. 2 shows four different examples of arranging the electric motors 11, 12, associated gears 3, 13, 14 and drive sprockets 4.

In the example which is illustrated at the left side, a separate electric motor 11, 12 is provided for each drive sprocket of a track of the tracklaying vehicle. Corresponding gears 13, 14, which may be designed as planetary gears, are directly assigned to each drive sprocket 4, with the electric motors being centrally assigned to the vehicle frame, and the gears 13, 14 and drive sprockets 4 in spatially direct fashion to the tracks.

In the subsequent example of arrangement, the electric motors 11, 12 with the interposed gears 13, 14 are directly arranged at the drive sprockets 4 and are thus directly assigned to the tracks.

In the next example of arrangement, an electric motor 11, 12 is provided which via a steering gear 3 is assigned to both planetary gears 13, 14 with associated drive sprocket 4. In this example, the electric motor 11, 12 and the steering gear 3 are centrally arranged on the vehicle frame, and the planetary gears 13, 14 are directly assigned to the drive sprockets 4.

In the last-mentioned example of arrangement, the steering gear 3 and the planetary gears 13, 14 are combined to form a unit and, like the individual electric motor 11, 12, are centrally arranged on the vehicle frame. In this case, it is only the drive sprockets 4 that are directly arranged in or on the track.

Figure 3:
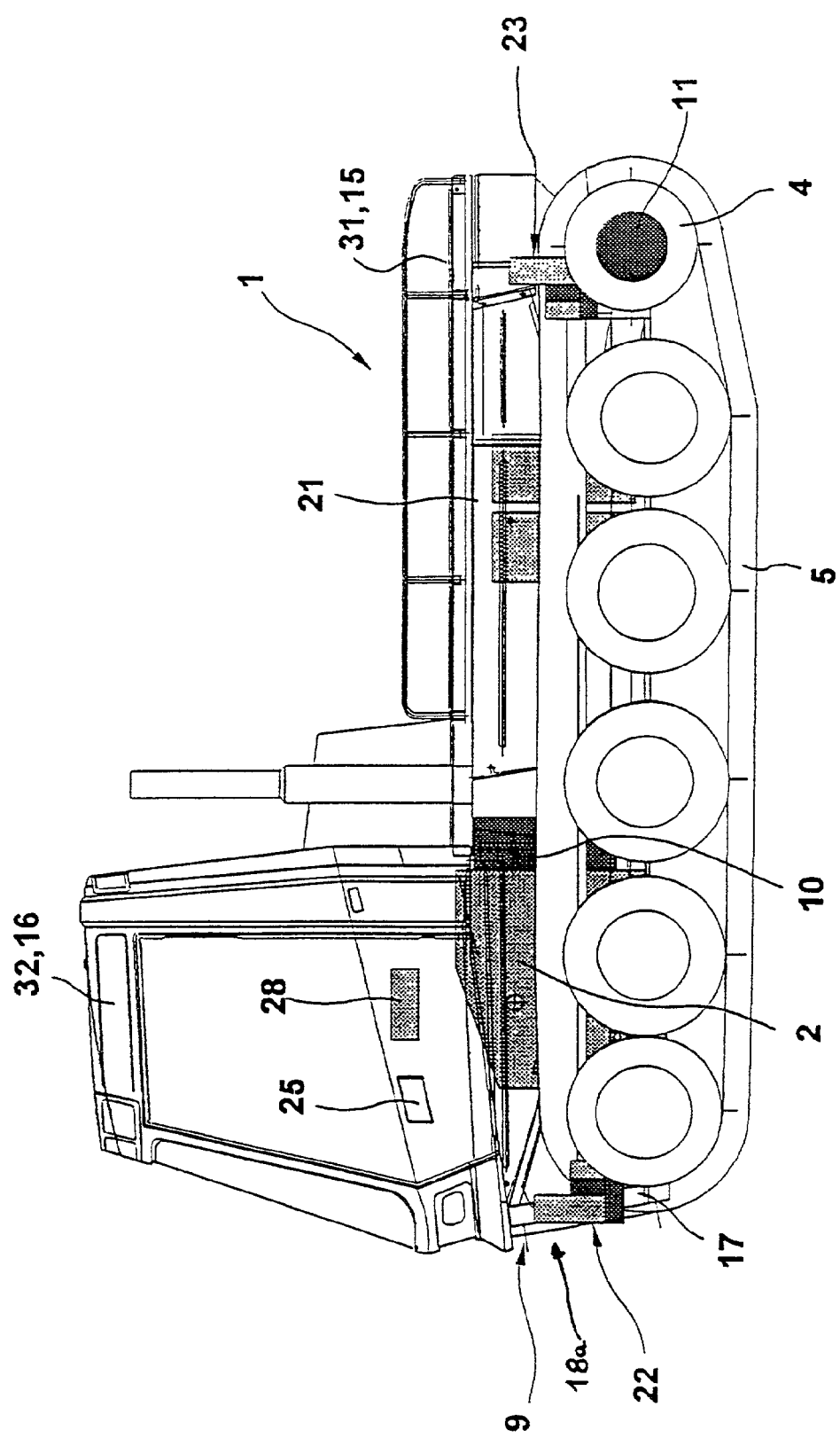
FIG. 3 is a side view of a first embodiment of a tracklaying vehicle.

FIG. 3 is a side view of a tracklaying vehicle 1 according to the invention.

The drive train proper, which consists of internal combustion engine 2, generator 10, electronic high-performance means 21 and electric motor 11 for the drive sprocket 4, is arranged in the illustrated embodiment substantially centrally in the longitudinal direction of the tracklaying vehicle 1. As for the spatial arrangement of the components, there is maximum freedom of design by virtue of the electrical connection of said components; as a consequence, it is possible to arrange the drive train on the tracklaying vehicle in different ways. In the illustrated embodiment, the electric motor 11 is directly assigned to the drive sprocket 4 which drives a track 5.

The tracklaying vehicle 1 compromises as further vehicle components 15, 16 a loading platform 31 and a driver's cab 32.

The tracklaying vehicle 1 comprises as further vehicle components 15, 16 a loading platform 31 and a driver's cab 32. These parts are tiltable by electric or electrohydraulic drives 52.

A control block 22 and 23, respectively, is arranged at the front and at the rear of the tracklaying vehicle 1. By analogy with FIG. 1, the block is designed with an electrohydraulic drive 18 as the accessory drive 6. These control blocks 22, 23 serve, for instance, to operate an adjusting means for push frame, or device carrier, which are not illustrated for the sake of simplicity. Reference numerals 9 and 18a outline only the principle of a front snow plow blower to be arranged on the corresponding front device carrier 18a of the tracklaying vehicle 1.

The vehicle control unit 28 and a diagnosis means 25 are arranged inside the driver's cab. The diagnosis means serves maintenance and inspection purposes. The diagnosis means can also be arranged at a different location of the tracklaying vehicle 1.

Figure 4:
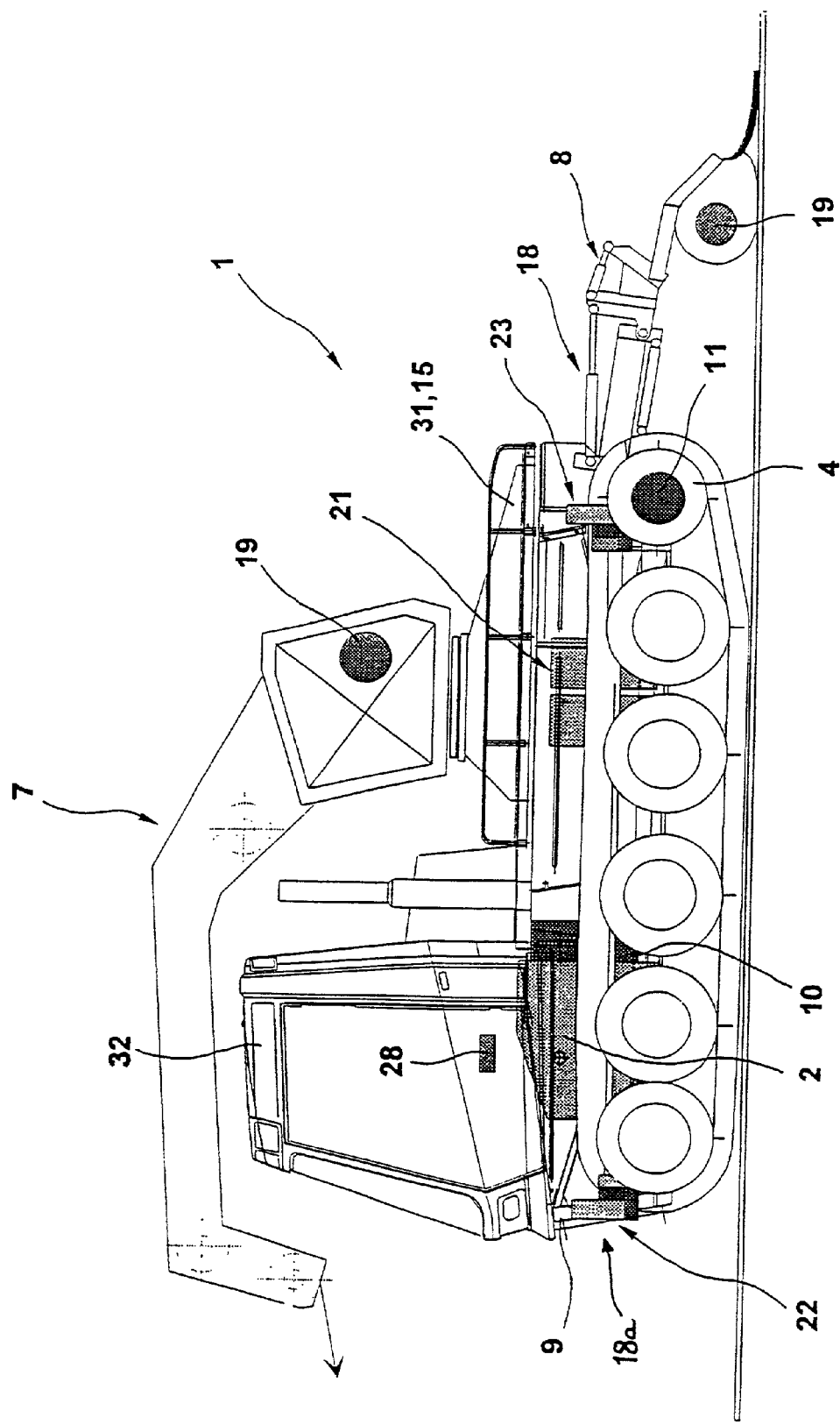
FIG. 4 is a side view of a further embodiment of a tracklaying vehicle.

FIG. 4 is a side view illustrating a further embodiment of a tracklaying vehicle 1. Like reference numerals designate like parts and are only mentioned in part.

At the rear of the tracklaying vehicle 1, a rotary snow plow with a downstream smoothing blade is arranged as an additional device 8. The snow plow comprises a shaft which is driven by an electric drive 19. The additional device 8 is adjustably and pivotably supported at the rear of the tracklaying vehicle 1 via a corresponding kinematic adjusting means with electrohydraulic drive 18.

The kinematic adjusting means for the additional device 8 can be operated via the rear control block 23, the electrohydraulic drive 18 being contained in the rear control block 23 in such a case.

A winch which comprises a reel with an electric drive 19 is arranged as a further additional device 7 on the loading platform 31.

Further additional devices or vehicle components, such as track tensioner 56 parking brake 58, snow plow blower or the like shown in FIGS. 3, 4 and 5.

What is claimed is:

1. A piste-maintenance tracklaying vehicle comprising:
   an internal combustion engine connected with a generator;
   at least one electric motor drivingly connected via at least one gear to at least one drive sprocket of at least one track and being switchable as a current generator in an overrun mode;
   at least one drive selected from the group consisting of electrohydraulic and electric accessory drives; and
   an electronic high performance device for controlling motors and accessory drives, wherein at least one electric accessory drive for a shaft of a rotary snow plow is synchronized with the at least one electric motor of said drive sprocket and wherein the electronic high performance device is connected to the accessory drives to directly operate the accessory drives with energy gained by the electric motor which is switched as a current generator in the overrun mode.

2. The piste-maintenance tracklaying vehicle according to claim 1, wherein a planetary gear is arranged between said electric motor and drive sprocket, and a steering gear is arranged in the case of only one electric motor for the drive sprocket of plural tracks comprising the at least one track.

3. The piste-maintenance tracklaying vehicle according to claim 1, wherein an energy buffer is fed by said generator or by said electric motor when switched to operate as a current generator.

4. The piste-maintenance tracklaying vehicle according to claim 1, wherein said internal combustion engine includes an electronic engine control.

5. The piste-maintenance tracklaying vehicle according to claim 1, wherein said electronic high-performance device is centrally arranged in said tracklaying vehicle for distributing energy to all consumers and for energy feedback.

6. The piste-maintenance tracklaying vehicle according to claim 1, wherein a winch with an electric accessory drive is capable of feeding back energy to the electronic high-performance device during downhill driving.

7. The piste-maintenance tracklaying vehicle according to claim 1, wherein said vehicle has a safety logic for starting and stopping purposes, said logic sensing at least a position of a traveling direction switch, an actuation of an accelerator and of a parking brake.

* * * * *